US011483206B2

(12) United States Patent
Szigeti et al.

(10) Patent No.: US 11,483,206 B2
(45) Date of Patent: Oct. 25, 2022

(54) NON-DISRUPTIVE IMPLEMENTATION OF POLICY CONFIGURATION CHANGES

(71) Applicant: Cisco Technology, Inc., San Jose, CA (US)

(72) Inventors: Thomas Szigeti, Vancouver (CA); David J. Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 16/989,684

(22) Filed: Aug. 10, 2020

(65) Prior Publication Data
US 2022/0045907 A1   Feb. 10, 2022

(51) Int. Cl.
*H04L 41/0893* (2022.01)
*H04L 41/0816* (2022.01)
*H04L 47/20* (2022.01)
*H04L 49/9047* (2022.01)
*H04L 49/901* (2022.01)
*H04L 41/084* (2022.01)
*H04L 47/50* (2022.01)

(52) U.S. Cl.
CPC ........ *H04L 41/0893* (2013.01); *H04L 41/084* (2013.01); *H04L 41/0816* (2013.01); *H04L 47/20* (2013.01); *H04L 47/50* (2013.01); *H04L 49/901* (2013.01); *H04L 49/9047* (2013.01)

(58) Field of Classification Search
CPC ............... H04L 41/0816; H04L 41/084; H04L 41/0893; H04L 41/0894; H04L 47/20; H04L 47/50; H04L 49/901; H04L 49/9021; H04L 49/9047
See application file for complete search history.

(56) References Cited

U.S. PATENT DOCUMENTS

| 10,701,582 B2 | 6/2020 | Henry et al. | |
| 2002/0194317 A1* | 12/2002 | Kanada | H04L 47/2408 709/223 |
| 2003/0227920 A1* | 12/2003 | Benayoun | H04L 49/1523 370/392 |

OTHER PUBLICATIONS

Cisco.Com, "Cisco TrustSec," 2013.

* cited by examiner

*Primary Examiner* — Zhensheng Zhang
(74) *Attorney, Agent, or Firm* — Patterson + Sheridan, LLP (57) ABSTRACT

Techniques for non-disruptive configuration changes are provided. A packet is received at a network device, and the packet is buffered in a common pool shared by a first processing pipeline and a second processing pipeline, where the first processing pipeline corresponds to a first policy and the second processing pipeline corresponds to a second policy. A first copy of a packet descriptor for the packet is queued in a first scheduler based on processing the first copy of the packet descriptor with the first processing pipeline. A second copy of the packet descriptor is queued in a second scheduler associated based on processing the second copy of the packet descriptor with the second processing pipeline. Upon determining that the first policy is currently active on the network device, the first copy of the packet descriptor is dequeued from the first scheduler.

20 Claims, 6 Drawing Sheets

NON-DISRUPTIVE IMPLEMENTATION OF POLICY CONFIGURATION CHANGES

TECHNICAL FIELD

Embodiments presented in this disclosure generally relate to network configuration. More specifically, embodiments disclosed herein relate to non-disruptive implementation of configuration changes.

BACKGROUND

A variety of techniques can be used to control the behavior of a network (and of the individual devices that make up the network). In many systems, policies (e.g., access policies) are used to define the way traffic is handled. To implement policies, configuration changes are applied to the applicable network nodes to change how they process network traffic. However, at the physical infrastructure level, applying such configuration changes (particularly with respect to policy-related changes), typically results in service disruption in existing systems. That is, while the changes are being made, the nodes are often unable to continue to process traffic, leading to disruptions. This service disruption in production networks typically requires that such changes be applied only during prescheduled change-windows, as opposed to dynamically or rapidly, as needed.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method. The method includes receiving, at a network device, a packet; buffering the packet in a common pool shared by a first processing pipeline and a second processing pipeline, wherein the first processing pipeline corresponds to a first policy and the second processing pipeline corresponds to a second policy; queueing a first copy of a packet descriptor for the packet in a first scheduler based on processing the first copy of the packet descriptor with the first processing pipeline; queueing a second copy of the packet descriptor in a second scheduler associated based on processing the second copy of the packet descriptor with the second processing pipeline; and upon determining that the first policy is currently active on the network device, dequeuing the first copy of the packet descriptor from the first scheduler.

Another embodiment presented in this disclosure is a computer product comprising logic encoded in a non-transitory medium, the logic executable to perform an operation comprising: receiving, at a network device, a packet; buffering the packet in a common pool shared by a first processing pipeline and a second processing pipeline, wherein the first processing pipeline corresponds to a first policy and the second processing pipeline corresponds to a second policy; queueing a first copy of a packet descriptor for the packet in a first scheduler based on processing the first copy of the packet descriptor with the first processing pipeline; queueing a second copy of the packet descriptor in a second scheduler associated based on processing the second copy of the packet descriptor with the second processing pipeline; and upon determining that the first policy is currently active on the network device, dequeuing the first copy of the packet descriptor from the first scheduler.

Another embodiment presented in this disclosure is a network device comprising logic encoded in a non-transitory medium, the logic executable to perform a first operation comprising: receiving, at the network device, a packet; buffering the packet in a common pool shared by a first processing pipeline and a second processing pipeline, wherein the first processing pipeline corresponds to a first policy and the second processing pipeline corresponds to a second policy; queueing a first copy of a packet descriptor for the packet in a first scheduler based on processing the first copy of the packet descriptor with the first processing pipeline; queueing a second copy of the packet descriptor in a second scheduler associated based on processing the second copy of the packet descriptor with the second processing pipeline; and upon determining that the first policy is currently active on the network device, dequeuing the first copy of the packet descriptor from the first scheduler.

EXAMPLE EMBODIMENTS

Embodiments of the present disclosure provide techniques for implementing configuration changes without service disruption. In some embodiments, as packets (or other data) are received, they are processed in accordance with an active policy used by the device or network. These policies can include, for example, access policies, traffic copy policies, quality of service (QoS) policies, and the like. Processing each packet can include marking (or remarking) each packet based on the policy, scheduling each packet (e.g., using one or more priority queues) based on the policy, and the like. In embodiments of the present disclosure, an "active" policy is used to process and transmit packets, while one or more "shadow" policies are prepared. In one embodiment, packets are buffered in a shared pool, and the packet (or a descriptor or indication thereof) is processed in parallel using each policy (e.g., the active policy and any shadow policies). In embodiments, a given policy can be a combination of one or more classifiers defining which packets the policy applies to, as well as one or more treatments defining how the selected packets should be handled. The system can then identify which policy or policies are active, and use the results from the corresponding pipeline to transmit/forward the packet. This allows other policies to be prepared live (e.g., while the node is still processing traffic using the active policy). When triggered, the node can switch to the new policy immediately, and no traffic is disrupted.

By utilizing embodiments of the present disclosure, configurations and policies can be modified rapidly and without disruption. This can dramatically improve the operations of the network. For example, suppose a given application is designated as was "priority," such that packets associated with the application are classified, marked, and scheduled end-to-end across the network in a manner that reflects this expressed priority intent. In many implementations, more bandwidth may be required to service the application than the default setting, or the application traffic may be cyclical in nature (e.g., requiring more network resources at specific times of the day, month, quarter, year, and the like). Machine learning or other techniques can identify these requirements and recommend specific policy changes at specific points in time to respond accordingly. By using embodiments of the present disclosure, the system can implement new configurations (such as queuing configurations) without disrupting traffic that is already being forwarded in the network. This allows the system to deploy automated and dynamic policies in network environments.

Figure 1:
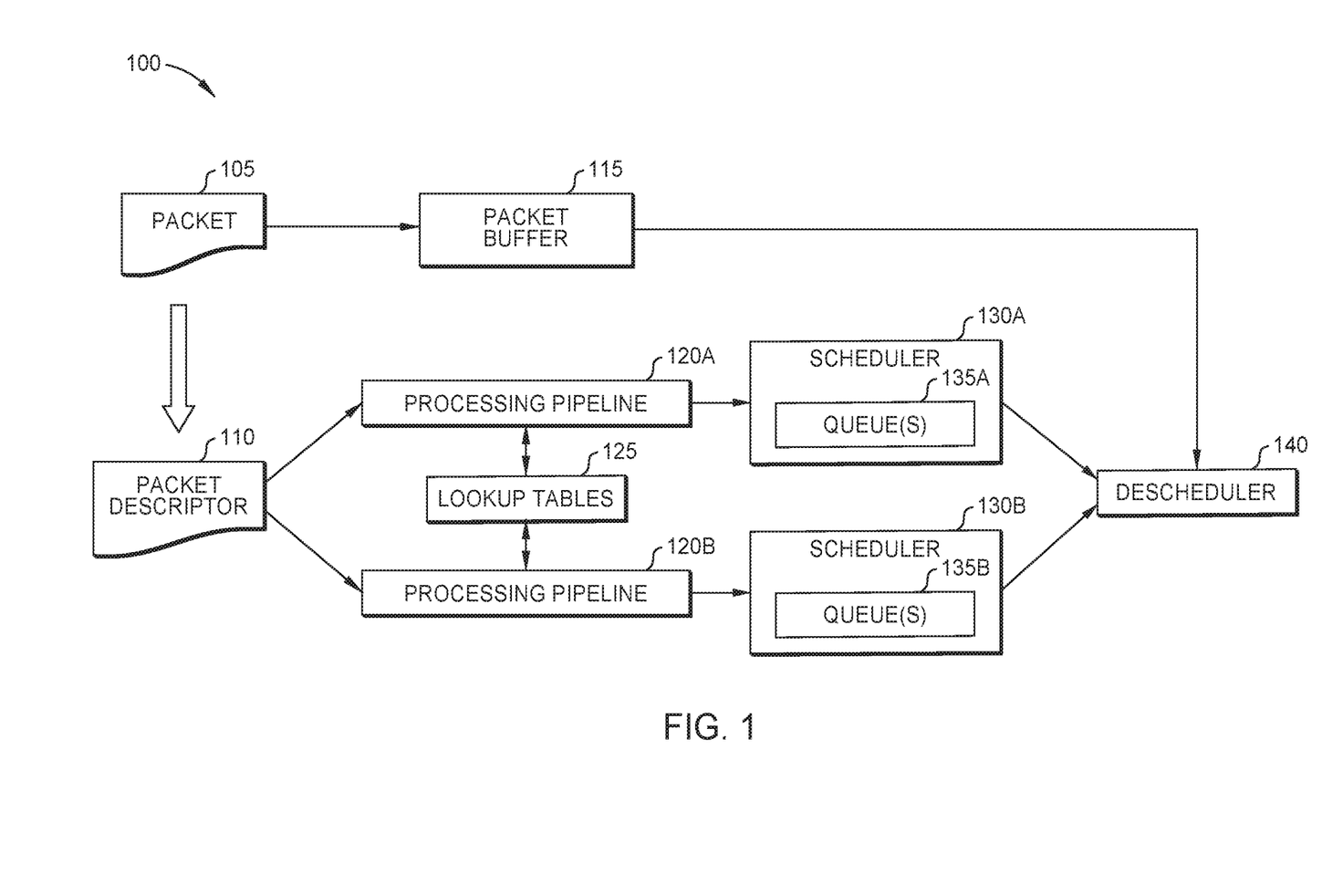
FIG. 1 is a workflow for non-disruptive configuration modification, according to some embodiments disclosed herein.

FIG. 1 is a workflow 100 for non-disruptive configuration modification, according to some embodiments disclosed herein. In the illustrated embodiments, when Packets 105 are received (e.g., by a network device or node), they are buffered in a Packet Buffer 115 while the node processes them. As illustrated, a Packet Descriptor 110 is generated for the Packet 105. In embodiments, the Packet Descriptor 110 generally contains metadata about the packet, such as the 5-tuples, QoS markings, the packet-length, and the like. As illustrated, the Packet Descriptor 110 is passed to two or more Processing Pipelines 120A-B, which enforces the active policy on the node. While typical systems use a single pipeline to implement the policy, embodiments of the present disclosure utilize two or more pipelines. In the illustrated embodiment, a dual packet processing pipeline is depicted, where two identical Packet Descriptors 110 (e.g., two copies of the Packet Descriptor 110) are created for each packet received. Each copy of the Packet Descriptor 110 is then processed (in parallel) against the policy rules defined by each Processing Pipeline 120A-B.

In an embodiment, the rules/results of the active policy (e.g., the results of the Processing Pipeline 120A) are enforced while the policy rules defined in the shadow policy or policies (e.g., the results of the Processing Pipeline 120B) are cached. That is, the results of applying the shadow policy (e.g., using the Processing Pipeline 120B) are computed but are not acted upon and do not affect active traffic flows. By caching the result of the shadow policy for each packet, the system can immediately switch policies without dropping any packets. For example, suppose the result of the shadow policy affects a subsequent scheduling decision (e.g. if the packet is marked/remarked, or sent to a particular queue. By caching the shadow policy results, the packet can immediately be handled using this policy if needed. In various embodiments, the results of a given Processing Pipeline 120 can include, without limitation, dropping the packet, permitting the packet, permitting but remarking the packet, and the like.

In the illustrated embodiment, each Processing Pipeline 120A-B can utilize a shared set of Lookup Tables 125, which reduces the overhead involved in implementing the separate pipelines. As illustrated, once a packet Processing Pipeline 120 has finished applying its respective policy to the Packet Descriptor 110, the Packet Descriptor 110 is passed to the corresponding Scheduler 130 for the Processing Pipeline 120. In the illustrated embodiment, the Processing Pipeline 120A uses the Scheduler 130A, while the Processing Pipeline 120B uses the Scheduler 130B. Thus, in embodiments, each policy (e.g., the active policy and any shadow policies) are implemented using discrete pipelines and schedulers.

In some embodiments, each Scheduler 130 is associated with a respective set of Queues 135. When a Packet Descriptor 110 is received from the Processing Pipeline 120, the Scheduler 130 places it in an appropriate Queue 135 based on the results of the processing. For example, if the policy prioritizes some traffic, the Scheduler 130 will place it on a higher-priority Queue 135, as compared to non-prioritized traffic.

In the illustrated embodiment, a single Descheduler 140 is used to selectively de-schedule or de-queue from the Schedulers 130. In an embodiment, the Descheduler 140 receives or retrieves the Packet Descriptors 110 from the active Scheduler 130 (e.g., the Scheduler 130 associated with the current active policy), and the other (shadow) Schedulers 130 are ignored. When the Descheduler 140 receives a given Packet Descriptor 110 from the active Scheduler 130, then the corresponding Packet 105 is removed from the shared Packet Buffer 115. The node can then transmit the Packet 105 across the (internal or external) interface in accordance with the network policies. In this manner, the results of the active policy (e.g., the Processing Pipeline 120 and Scheduler 130 that correspond to the active policy) are enforced, while the results of the shadow policy or policies (e.g., the Processing Pipeline 120 and Scheduler 130 corresponding to the shadow policy) are effectively cached until the corresponding Packet 105 leaves the node.

In embodiments, because the descheduling results will depend on the previously-made scheduling decisions, the shadow policy results are cached so as to have them ready in order to support an instantaneous policy change, as discussed in more detail below. In various embodiments, example scheduling results can include, without limitation, enqueuing the packet in a particular Queue 135 (as well as an optional threshold), remarking the packet, dropping the packet (e.g., due to Weighted Random Early Detect (WRED)), setting the Explicit Congestion Notification (ECN) bits on the packet, dropping the packet due to tail-drop (e.g., due to out-of-buffer allocation), transmitting the packet, and the like.

In some embodiments, a policy change trigger mechanism is utilized to direct the instantaneous switch from the active policy to a shadow policy, once it the shadow policy is ready (e.g., fully programmed in data plane hardware, designated by the network manager or network management system to become active at a given time, and the like). In some embodiments, the policy change trigger can be local to a specific device or node (e.g., via a Command Line Interface (CLI) command). In some embodiments, the trigger may be a packet received from a centralized network controller, such that the policy becomes active across the network (at each individual device or node) at roughly the same time. In embodiments, the policy may be implemented effectively simultaneously, with some variance or error due to network latency affecting how closely-synchronized the network devices are in the policy activation.

In at least one embodiment, the trigger can be time-based, such as by specifying a time (e.g., with millisecond or microsecond accuracy). In one such embodiment, the system utilizes Precision Time Protocol (PTP) to determine when the policy becomes active network-wide. Such an embodiment may allow highly-accurate network-wide simultaneous activation of the policy.

Figure 2:
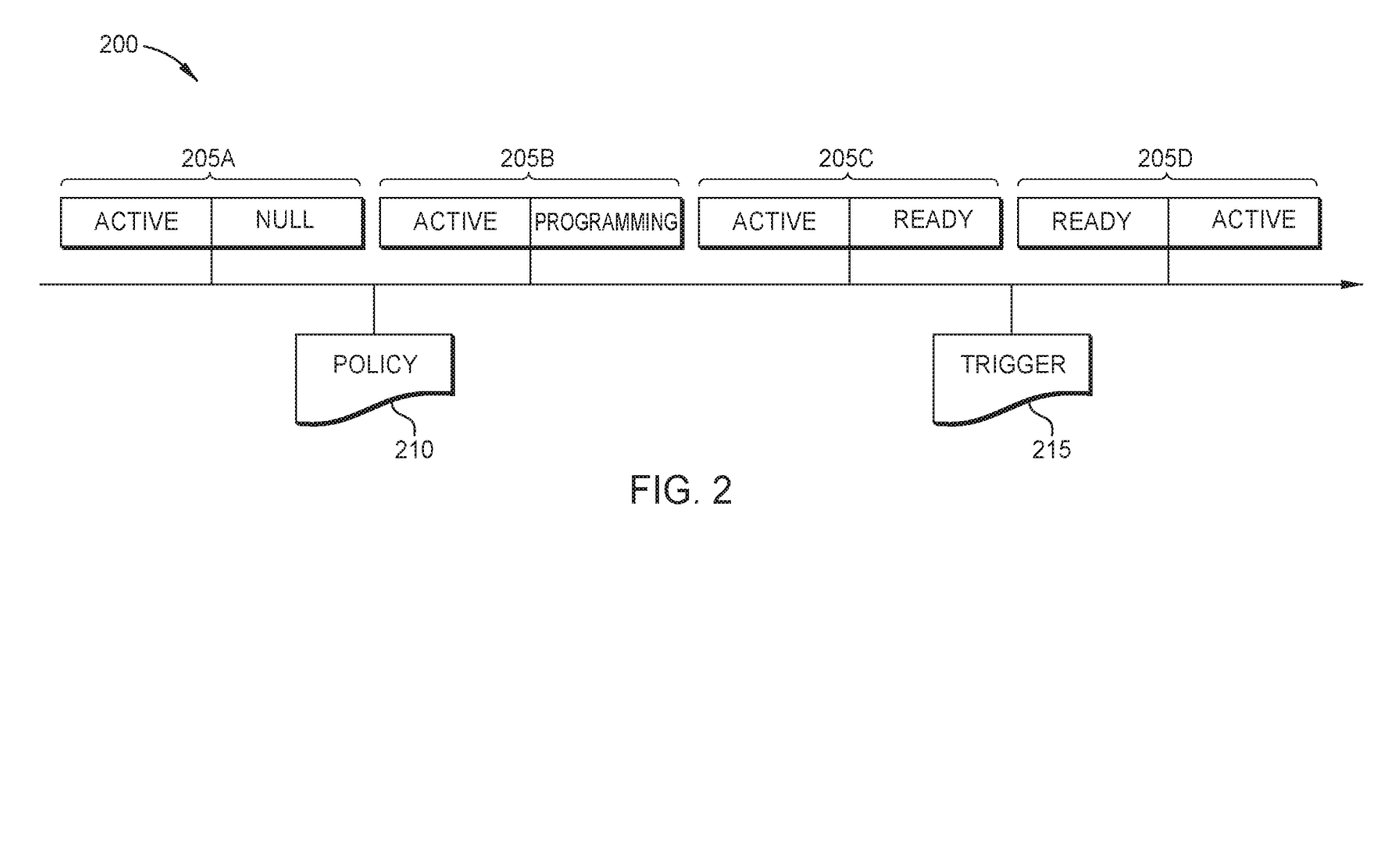
FIG. 2 illustrates a timeline of configuration changes in a non-disruptive system, according to some embodiments disclosed herein.

FIG. 2 illustrates a timeline 200 of configuration changes in a non-disruptive system, according to some embodiments disclosed herein. In the illustrated embodiment, during each Interval 205A-D, the status of each Processing Pipeline 120 is indicated as "Active," "Null," "Programming," or "Ready." In an embodiment, when the initial network device is started/booted up, no policy has been applied to the network device. At this point, the results of both the active Processing Pipeline 120 and shadow Processing Pipeline 120 are null (e.g., no policy action is to be applied to any packet). Similarly, at this stage, the results from the active Scheduler 130 and the shadow Scheduler 130 are similarly null (e.g., no non-default queuing policy is applied to any packet, and packets are treated with default first-in-first-out (FIFO) queuing). In some embodiments, this initial state is referred to as "Null/Null."

In embodiments, at some future time, a policy can be configured (e.g., by an operator directly or via a network controller) which becomes the active policy. This is illustrated in Interval 205A. From this time on, the results from the active Processing Pipeline 120 and the active Scheduler 130 will determine packet treatment. Note that, as illustrated, the results from the shadow Processing Pipeline 120 and the shadow Schedule 130 remain null, because (as of yet) there is no shadow policy. In an embodiment, therefore, this state is referred to as "Active/Null."

As illustrated, at some subsequent point in time, a new policy may begin to be configured (again, by an operator directly or via a network controller). In the illustrated embodiment, this is depicted as a new Policy 210 being added, and initiates Interval 205B. In at least one embodiment, the only change in behavior at this point is that the results from the shadow Processing Pipeline 120 are no longer null. However, these results are not yet usable, as the programming of this shadow Processing Pipeline 120 is not yet complete. Similarly, the results derived from the shadow Scheduler 130 are no longer null, but are also unusable for the same reason. In some embodiments, this period of programming the shadow policy into the data plane can be referred to as an "Active/Programming" state.

In the illustrated embodiment, after some period of programming, the system enters the Interval 205C. In some embodiments, this transition occurs relatively shortly after the receipt of the Policy 210 (e.g., within 50 milliseconds or less on most modern application-specific integrated circuits (ASICs)). Once programming of the shadow Policy 210 into the data plane hardware is complete, the shadow Policy 210 is considered "ready." At this point, in an embodiment, the dual processing pipeline is computing two complete sets of policy results: the active Processing Pipeline 120 result (which is being enforced) and the shadow Processing Pipeline 120 result (which is being cached). Similarly, in an embodiment, the Schedulers 130 are making two sets of scheduling decisions: one based on the active Scheduler 130 (which is being enforced) and one based on the shadow Scheduler 130 (which is being cached). In some embodiments, this state is referred to as "Active/Ready." At this point, the node is prepared for an instantaneous policy change.

As illustrated, at some point after the shadow policy is "ready," a Trigger 215 occurs. In various embodiments, this policy-change trigger can be activated in any number of ways, including a local trigger (e.g., via a command-line interface), a packet-based trigger, a time-based trigger, and the like. When the Trigger 215 occurs, the Interval 205D begins instantaneously (or nearly instantaneously), when the shadow Processing Pipeline 120 becomes the active Processing Pipeline 120 (and the active Processing Pipeline 120 becomes the shadow Processing Pipeline 120). Similarly, the shadow Scheduler 130 becomes the active Scheduler 130, and vice-versa. Thus, a fully programmed policy can become active without any service disruption. In the illustrated embodiment, this state is referred to as "Ready/Active."

In one embodiment, this change-over is accomplished in a single clock-cycle. Further, in some embodiments, because the results of the shadow policy were being cached, the (formerly) shadow policy can be used to affect packet handling immediately. That is, packets which were already received by the node but not-yet output from the node can be processed and output using the (formerly) shadow policy immediately. This eliminates service disruption, as the treatment of all packets is changed immediately (e.g., rather than waiting for new packets to traverse the node).

Although two policies are depicted for conceptual clarity, in embodiments, each node may maintain any number of shadow policies at a given time. In an embodiment, the instantaneous policy change without service disruption enables policy rollback to be accomplished similarly in an instantaneous and non-disruptive manner. For example, suppose that the operator later wishes to revert to the previous policy. To do so, the Trigger 215 can simply be activated again, as all elements programmed in both the control and data planes remain in the "Active/Ready" state (e.g., both pipelines and schedulers are producing valid results). In some embodiments, this allows the network operator to test new policies with the assurance that it can rapidly rolled back to the previous policy if any issues are encountered, without any traffic flow disruption in both the forward and back-out direction.

In some embodiments, the system can allow the effect of a given shadow policy on actual traffic flow to be monitored before it becomes active. For example, in some embodiments, the node can collect metrics relating to the packet processing in an active Processing Pipeline 120 while traffic flow through the nodes. In an embodiment, the results and metrics relating to the shadow policy (once in a ready state), can also be collected, displayed, or analyzed. This allows operators to view the effect that the specific change will have on the actual traffic flowing through the network (as opposed to a theoretical model of the traffic). In embodiments, this can allow network administrators to deploy policy changes with greater confidence, as the effect of any new policies can be analyzed prior to the policy being placed into effect on real, end-user and end-device traffic flows.

Further, in some embodiments, the system allows such policy changes to be monitored for relatively extended periods of time by network operators before they are activated. For example, the system may preview the results of a shadow policy over the course of a day, week, month, and the like. This can allow the system or administrators to determine whether the shadow policies work properly across a variety of contexts. For example, a given policy may work well for daytime user and device traffic, but cause problems when large backups happen at night. By using some embodiments of the present disclosure, the network manager or management system can identify these concerns in advance.

In some embodiments, embodiments described herein obviate the need for packet recirculation in packet processing, because both sets of policy decisions are made simultaneously. That is, because all packets are analyzed using both the active and the shadow pipeline(s), the system can immediately switch between policies without requiring any buffered (but not yet output) packets to be recirculated or re-processed in the node. This improves packet processing latency and eliminates the impact of instantiating two sets of policies sequentially into a network device.

In some embodiments, the processing pipelines are implemented efficiently without requiring buffers on ASICs, which can be expensive. That is, some embodiments described herein do not require multiple sets of output buffers (each corresponding to a distinct queuing or dequeuing structure). Instead, as discussed above, the packets can reside in a common buffer pool until the Descheduler instructs that they be transmitted or dropped. In some embodiments, the respective Schedulers 130 can operate on packet descriptors (PDs) as with existing ASICs, and the system need only generate two packet descriptors for each packet in the common buffer. This allows the system to efficiently operate with two sets of packet processing and scheduling results: one from the active pipeline and scheduler and the other from the shadow pipeline and scheduler.

Figure 3:
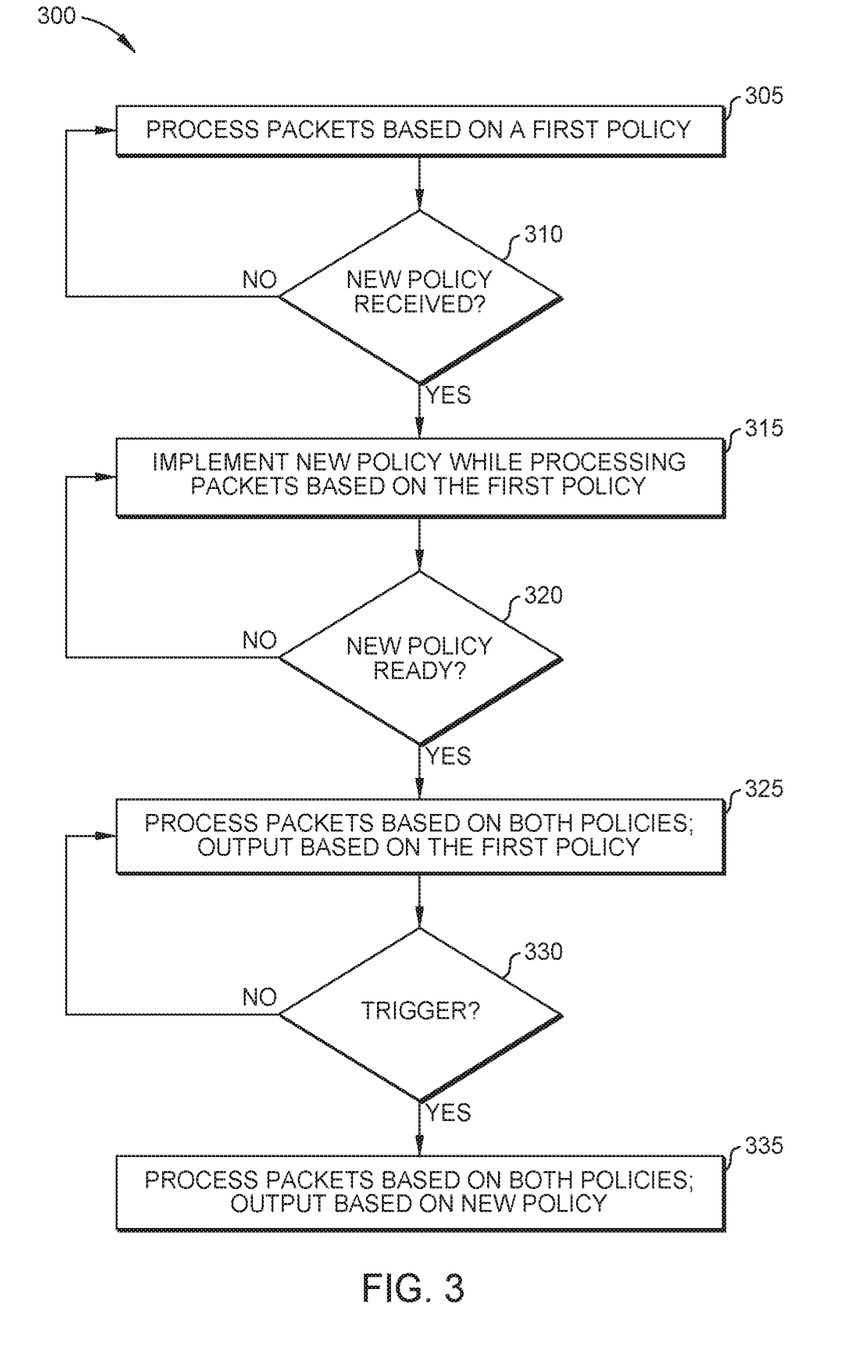
FIG. 3 is a flow diagram depicting a method of implementing configuration changes without service disruption, according to some embodiments disclosed herein.

FIG. 3 is a flow diagram depicting a method 300 of implementing configuration changes without service disruption, according to some embodiments disclosed herein. The method 300 begins at block 305, where a network device processes packets using a first policy. For example, the network device may have an active policy (configured in one processing pipeline). At block 310, the network device determines whether a new policy has been received. If not, the method 300 returns to block 305. In this way, the network device can process packets using the first policy until changes are required. If a new policy has been received, the method 300 proceeds to block 315.

At block 315, the network device begins implementation of the new policy, while continuing to process packets using the prior (first) policy. In some embodiments, as discussed above, this includes preparing one or more pipelines, schedulers, or other components to enact the new policy. During this programming phase, the first policy remains enacted and active on at least one pipeline and scheduler. The method 300 then continues to block 320, where the network device determines whether the new policy is ready to be activated. In at least one embodiment, this includes confirming whether the shadow pipeline and scheduler are ready.

If the new policy is not yet ready, the method 300 returns to block 315 to continue work on programming the new policy, while packets continue to be processed using the original (first) policy. If the new policy is ready, the method 300 proceeds to block 325, where the network device processes all received packets using both the first policy and the new policy, as discussed above. That is, new packets are evaluated using the active first policy and the shadow new policy. However, the output of the network device is defined based only on the active first policy. The method 300 then continues to block 330, where the network device determines whether a predefined trigger has occurred. In embodiments, this trigger may take any number of forms.

If the trigger has not occurred, the method 300 returns to block 325. In this way, the network device can continue to process packets using both pipelines and output results based only on the first policy indefinitely. If, at block 330, the trigger occurs, the method 300 continues to block 335, where the network device continues to process packets using both policies, but immediately begins outputting packets based on the new policy, as discussed above. In this way, the trigger causes the network device to rapidly swap the active and shadow policies, without disrupting traffic or dropping any packets.

Figure 4:
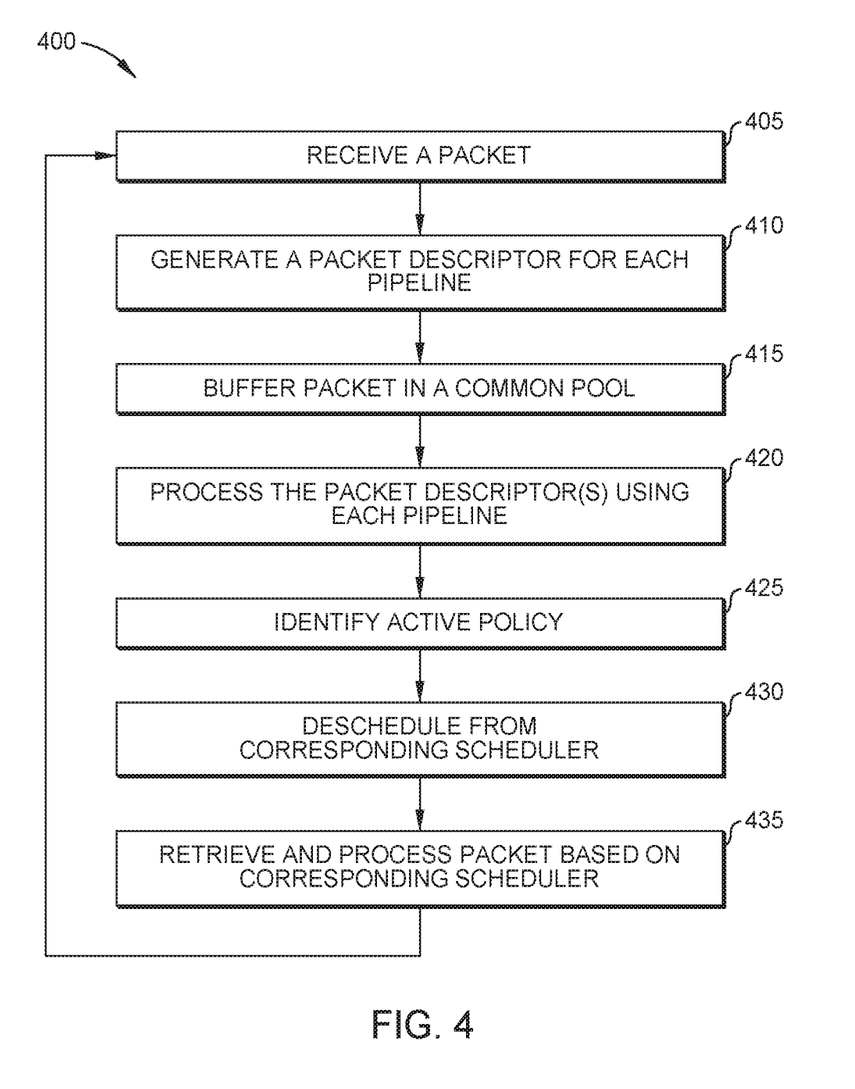
FIG. 4 is a flow diagram depicting a method of seamlessly processing data in a non-disruptive configuration system, according to some embodiments disclosed herein.

FIG. 4 is a flow diagram depicting a method 400 of seamlessly processing data in a non-disruptive configuration system, according to some embodiments disclosed herein. The method 400 begins at block 405, where the network device receives a packet. At block 410, the network device generates one or more packet descriptors for the received packet, one for each policy or pipeline. That is, if the network device includes a dual pipeline arrangement, the network device generates two identical packet descriptors for the received packet. In some embodiments, the network device only generates a packet descriptor for each policy or pipeline that is in a "ready" or "active" state. In one such embodiment, the network device refrains from generating packet descriptors for any pipelines that are "null" or "programming." In another embodiment, the network device can generate and distribute a packet descriptor to all pipelines, regardless of the status of each.

At block 415, the network device buffers the received packet in a common pool, as discussed above. This allows the network device to deploy multiple processing pipelines without requiring multiple corresponding buffers. At block 420, the network device processes the generated packet descriptors using each pipeline, as discussed above. In embodiments, each active or ready pipeline can be configured to evaluate and process packets based on a corresponding policy. The results of this evaluation/processing are used to place the packet descriptor in one or more queues associated with the pipeline (e.g., via a scheduler associated with the pipeline). The method 400 then continues to block 425, where the network device identifies the active policy on the node. In some embodiments, as discussed above, a given network device can have one active policy (e.g., one policy that is driving output) and any number of shadow policies (whose results are cached but not used to affect packet handling).

Once the active policy is identified, at block 430, the network device (e.g., the descheduler) deschedules from the corresponding scheduler for the active policy/pipeline. In one embodiment, the descheduler does so by de-queueing packet descriptors from the appropriate scheduler, At block 435, the network device can use the de-queued packet descriptor to retrieve and process the received packet in accordance with the active policy/pipeline/scheduler. The method 400 then returns to block 405.

In one embodiment, because the packet descriptor is processed using both the active and the shadow policy, the network device can immediately switch to the shadow policy as needed. For example, suppose a packet is received at time zero when the first policy is active. The packet descriptor can be processed by each pipeline in parallel. Each pipeline then places the packet descriptor on an appropriate queue for output. Before the packet is output, however, suppose a trigger occurs and the network device switches to a second policy. In embodiments, the network device can use the cached results to output the packet based on the (formerly) shadow policy, even though it was received while the first policy was active. This eliminates packet recirculation and service disruption.

Figure 5:
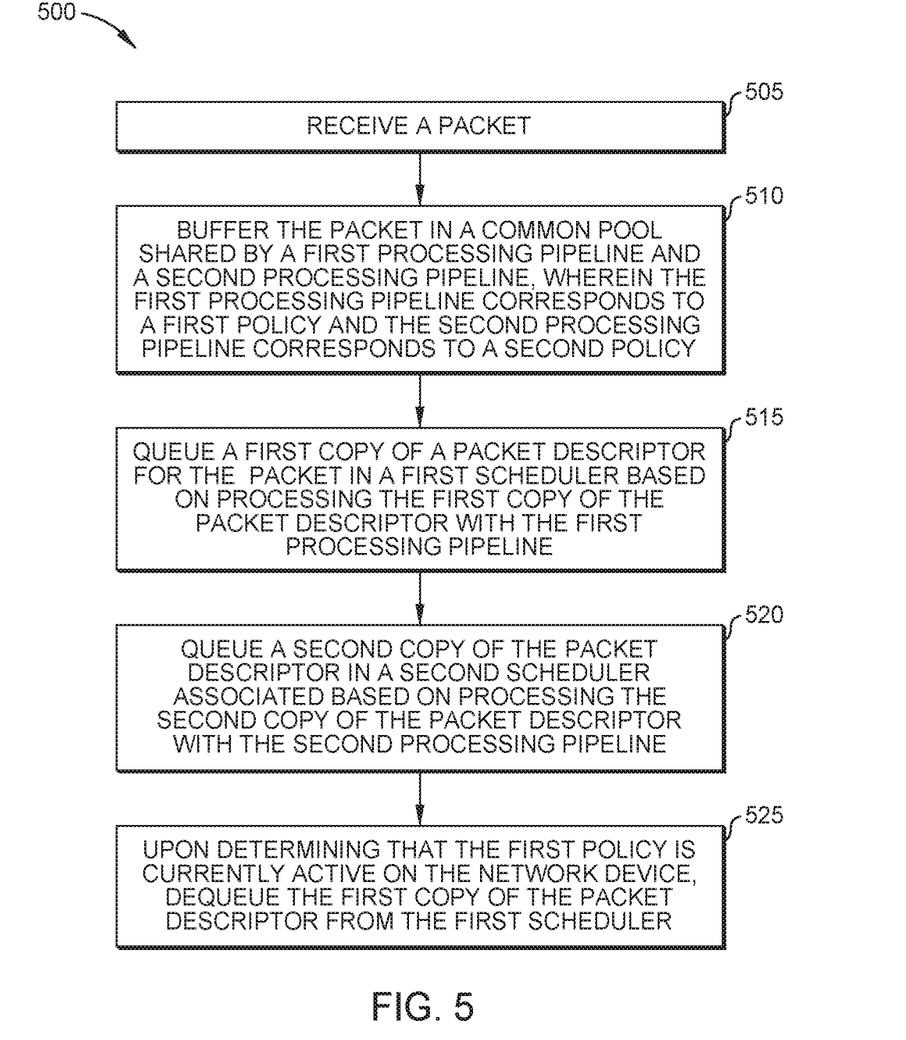
FIG. 5 is a flow diagram depicting a method of providing non-disruptive policy configurations, according to some embodiments disclosed herein.
Figure 6:
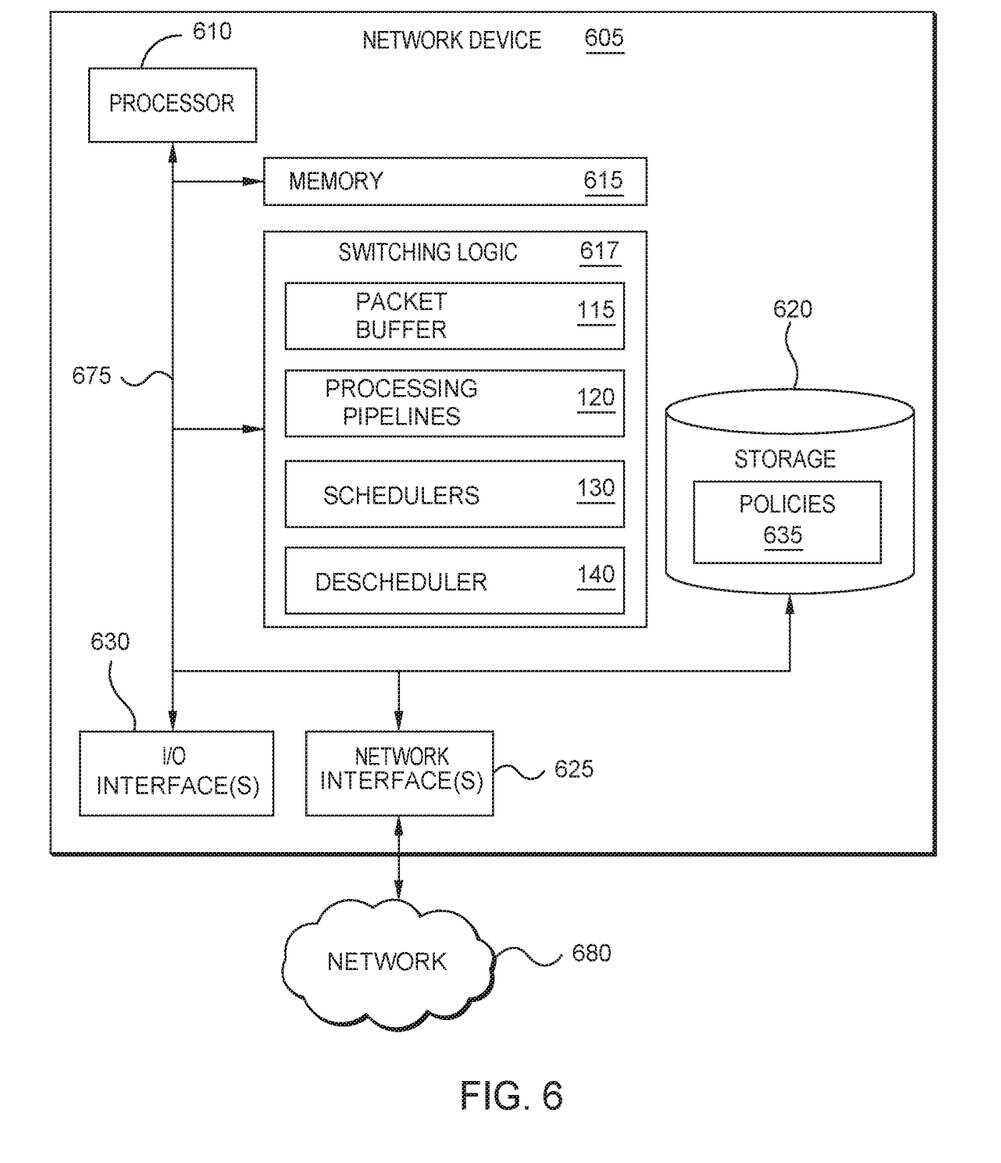
FIG. 6 is a block diagram illustrating a network device configured to provide non-disruptive policy configurations, according to some embodiments disclosed herein.

FIG. 5 is a flow diagram depicting a method 500 of providing non-disruptive policy configurations, according to some embodiments disclosed herein. The method 500 begins at block 505, where a network device receives a packet. At block 510, the network device buffers the packet in a common pool shared by a first processing pipeline and a second processing pipeline, wherein the first processing pipeline corresponds to a first policy and the second processing pipeline corresponds to a second policy. The method 500 then proceeds to block 515, where the network device queues a first copy of a packet descriptor for the packet in a first scheduler based on processing the first copy of the packet descriptor with the first processing pipeline. Similarly, at block 520, the network device queues a second copy of the packet descriptor in a second scheduler associated based on processing the second copy of the packet descriptor with the second processing pipeline. At block 525, upon determining that the first policy is currently active on the network device, the network device dequeues the first copy of the packet descriptor from the first scheduler, FIG. 6 is a block diagram illustrating a Network Device 605 configured to provide non-disruptive policy configurations, according to some embodiments disclosed herein. Although depicted as a single physical device, in some embodiments, some or all of the functionality described herein can be performed by one or more devices jointly, by one or more virtual machines, and the like. The Network Device 605 generally corresponds to any logical node in a network. As illustrated, the Network Device 605 includes a Processor 610, Memory 615, Switching Logic 617, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interfaces 625 (which may include one or more ports), the Network Device 605 can be communicatively coupled with one or more other devices and components (e.g., via the Network 680, which may include the Internet, local network(s), and the like). Additionally, the Network 680 may include wired connections, wireless connections, or a combination of wired and wireless connections. Further, as illustrated, the Processor 610, Memory 615, Switching Logic 617, Storage 620, Network Interface(s) 625, and I/O Interface(s) 630 are communicatively coupled by one or more Buses 675.

In the illustrated embodiment, the Storage 620 includes a set of Policies 635. Although depicted as residing in Storage 620, in embodiments, the Policies 635 may be located in any suitable location. For example, in some embodiments some or all of the Policies 635 may be stored in a centralized repository for the network (e.g., by a wireless controller). Each Policy 635 generally specifies selection criteria defining which packets the policy applies to, and treatment criteria specifying how selected packets should be handled.

In the illustrated embodiment, the Switching Logic 617 handles processing and routing of packets through the Network Device 605. In embodiments, the Switching Logic 617 is logic encoded in a non-transitory medium (e.g., encoded in software stored in memory or storage, encoded via one or more hardware components, or a combination thereof). In one embodiment, the Switching Logic 617 is implemented through software (e.g., as an application stored in Memory 615). In other embodiments, the Switching Logic 617 is implemented using one or more integrated circuits, such as an application-specific integrated circuit (ASIC). In some embodiments, the Switching Logic 617 is a mixture of hardware and software. In the illustrated embodiment, when packets are received via one or more ports (e.g., Network Interfaces 625), they are processed according to the Switching Logic 617.

As illustrated, the Switching Logic 617 includes a Packet Buffer 115, a set of Processing Pipelines 120, a set of Schedulers 130, and a Descheduler 140. Although depicted as discrete components for conceptual clarity, in embodiments, the operations of the Packet Buffer 115, Processing Pipelines 120, Schedulers 130, and Descheduler 140 may be combined or distributed across any number of components and devices.

In an embodiment, as discussed above, the Packet Buffer 115 is a shared pool used to buffer received packets while they are evaluated and processed by the Processing Pipelines 120. The Packet Buffer 115 is shared in that each pipeline does not require its own independent buffer. Instead, a single copy of the packet is buffered in the Packet Buffer 115, and the packet is handled based on the active policy.

As discussed above, the Processing Pipelines 120 can generally correspond to any number and variety of operations and processes to evaluate and handle received packets for the Network Device 605. In an embodiment, each Processing Pipeline 120 is associated with a given configuration (e.g., a given policy). Additionally, in an embodiment, each Processing Pipeline 120 can be associated with a state, which may include, for example, "null," "programming," "ready" or "shadow," and "active." Further, in the illustrated embodiment, each Processing Pipeline 120 is associated with a corresponding Scheduler 130. As discussed above, each Scheduler 130 can similarly be associated with a state. In embodiments, the Descheduler 140 generally dequeues from whichever Scheduler 130 is designated as "active," and ignores all others. When a packet descriptor is dequeued from a Scheduler 130, the corresponding packet is retrieved from the shared Packet Buffer 115 and forwarded in accordance with the active policy.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, at a network device, a packet;
buffering the packet in a common pool shared by a first processing pipeline associated with a first scheduler and a second processing pipeline associated with a second scheduler, wherein the first processing pipeline corresponds to a first policy and the second processing pipeline corresponds to a second policy;
queueing a first copy of a packet descriptor for the packet in the first scheduler based on processing the first copy of the packet descriptor with the first processing pipeline;
queueing a second copy of the packet descriptor in the second scheduler associated based on processing the second copy of the packet descriptor with the second processing pipeline;
upon determining that the first policy is currently active on the network device, dequeuing the first copy of the packet descriptor from the first scheduler; and
retrieving the packet from the common pool using the first copy of the packet descriptor.

2. The method of claim 1, further comprising:
processing the packet based on the first policy.

3. The method of claim 1, further comprising:
receiving an instruction to activate the second policy on the network device; and
in response to receiving the instruction, dequeuing subsequent packet descriptors from the second scheduler.

4. The method of claim 3, further comprising:
receiving, at the network device, a second packet, wherein the second packet is received while the first policy is active and prior to receiving the instruction; and
in response to receiving the instruction, dequeuing a second packet descriptor of the second packet from the second scheduler.

5. The method of claim 1, further comprising:
collecting a first set of metrics related to processing the first copy of the packet descriptor with the first processing pipeline; and
collecting a second set of metrics related to processing the second copy of the packet descriptor with the second processing pipeline.

6. The method of claim 1, wherein the first scheduler comprises a plurality of queues, and wherein queueing the first copy of the packet descriptor in the first scheduler comprises selecting one of the plurality of queues based at least in part on the processing of the first copy of the packet descriptor with the first processing pipeline.

7. The method of claim 1, further comprising:
receiving the first policy from a controller, wherein before the first policy is received, the first processing pipeline is in a null state;
associating the first processing pipeline with a programming state during implementation of the first policy;
upon determining that the implementation of the first policy is complete, associating the first processing pipeline with a ready state; and
upon receiving a trigger, associating the first processing pipeline with an active state.

8. A computer product comprising logic encoded in a non-transitory medium, the logic executable to perform an operation comprising:
receiving, at a network device, a packet;
buffering the packet in a common pool shared by a first processing pipeline associated with a first scheduler and a second processing pipeline associated with a second scheduler, wherein the first processing pipeline corresponds to a first policy and the second processing pipeline corresponds to a second policy;
queueing a first copy of a packet descriptor for the packet in a first scheduler based on processing the first copy of the packet descriptor with the first processing pipeline;
queueing a second copy of the packet descriptor in a second scheduler associated based on processing the second copy of the packet descriptor with the second processing pipeline;
upon determining that the first policy is currently active on the network device, dequeuing the first copy of the packet descriptor from the first scheduler; and
retrieving the packet from the common pool using the first copy of the packet descriptor.

9. The computer product of claim 8, the operation further comprising:
processing the packet based on the first policy.

10. The computer product of claim 8, the operation further comprising:
receiving an instruction to activate the second policy on the network device; and
in response to receiving the instruction, dequeuing subsequent packet descriptors from the second scheduler.

11. The computer product of claim 10, the operation further comprising:
receiving, at the network device, a second packet, wherein the second packet is received while the first policy is active and prior to receiving the instruction; and
in response to receiving the instruction, dequeuing a second packet descriptor of the second packet from the second scheduler.

12. The computer product of claim 8, the operation further comprising:
collecting a first set of metrics related to processing the first copy of the packet descriptor with the first processing pipeline; and
collecting a second set of metrics related to processing the second copy of the packet descriptor with the second processing pipeline.

13. The computer product of claim 8, wherein the first scheduler comprises a plurality of queues, and wherein queueing the first copy of the packet descriptor in the first scheduler comprises selecting one of the plurality of queues based at least in part on the processing of the first copy of the packet descriptor with the first processing pipeline.

14. The computer product of claim 8, the operation further comprising:
receiving the first policy from a controller, wherein before the first policy is received, the first processing pipeline is in a null state;
associating the first processing pipeline with a programming state during implementation of the first policy;
upon determining that the implementation of the first policy is complete, associating the first processing pipeline with a ready state; and
upon receiving a trigger, associating the first processing pipeline with an active state.

15. A network device comprising logic encoded in a non-transitory medium, the logic executable to perform an operation comprising:
receiving, at the network device, a packet;
buffering the packet in a common pool shared by a first processing pipeline associated with a first scheduler and a second processing pipeline associated with a second scheduler, wherein the first processing pipeline corresponds to a first policy and the second processing pipeline corresponds to a second policy;
queueing a first copy of a packet descriptor for the packet in a first scheduler based on processing the first copy of the packet descriptor with the first processing pipeline;
queueing a second copy of the packet descriptor in a second scheduler associated based on processing the second copy of the packet descriptor with the second processing pipeline; and
upon determining that the first policy is currently active on the network device, dequeuing the first copy of the packet descriptor from the first scheduler; and
retrieving the packet from the common pool using the first copy of the packet descriptor.

16. The network device of claim 15, the operation further comprising:
processing the packet based on the first policy.

17. The network device of claim 15, the operation further comprising:
receiving an instruction to activate the second policy on the network device; and
in response to receiving the instruction, dequeuing subsequent packet descriptors from the second scheduler.

18. The network device of claim 17, the operation further comprising:
receiving, at the network device, a second packet, wherein the second packet is received while the first policy is active and prior to receiving the instruction; and
in response to receiving the instruction, dequeuing a second packet descriptor of the second packet from the second scheduler.

19. The network device of claim 15, the operation further comprising:
- collecting a first set of metrics related to processing the first copy of the packet descriptor with the first processing pipeline; and
- collecting a second set of metrics related to processing the second copy of the packet descriptor with the second processing pipeline.

20. The network device of claim 15, the operation further comprising:
- receiving the first policy from a controller, wherein before the first policy is received, the first processing pipeline is in a null state;
- associating the first processing pipeline with a programming state during implementation of the first policy;
- upon determining that the implementation of the first policy is complete, associating the first processing pipeline with a ready state; and
- upon receiving a trigger, associating the first processing pipeline with an active state.

* * * * *

UNITED STATES PATENT AND TRADEMARK OFFICE
CERTIFICATE OF CORRECTION

PATENT NO. : 11,483,206 B2
APPLICATION NO. : 16/989684
DATED : October 25, 2022
INVENTOR(S) : Thomas Szigeti et al.

It is certified that error appears in the above-identified patent and that said Letters Patent is hereby corrected as shown below:

In the Specification

In Column 5, Line 53, delete "2050." and insert -- 205C. --.

In Column 8, Line 49, delete "scheduler," and insert -- scheduler. --.

In Column 9, Line 21, delete "scheduler," and insert -- scheduler. --.

Signed and Sealed this
Third Day of January, 2023

Katherine Kelly Vidal
*Director of the United States Patent and Trademark Office*